3,186,184
AIR CONDITIONING CONTROL APPARATUS
Cary H. Pruitt, Muskogee, Okla., assignor of one-half to Portable Equipment, Incorporated, Muskogee, Okla., a corporation of Oklahoma
Filed Dec. 23, 1963, Ser. No. 332,772
6 Claims. (Cl. 62—243)

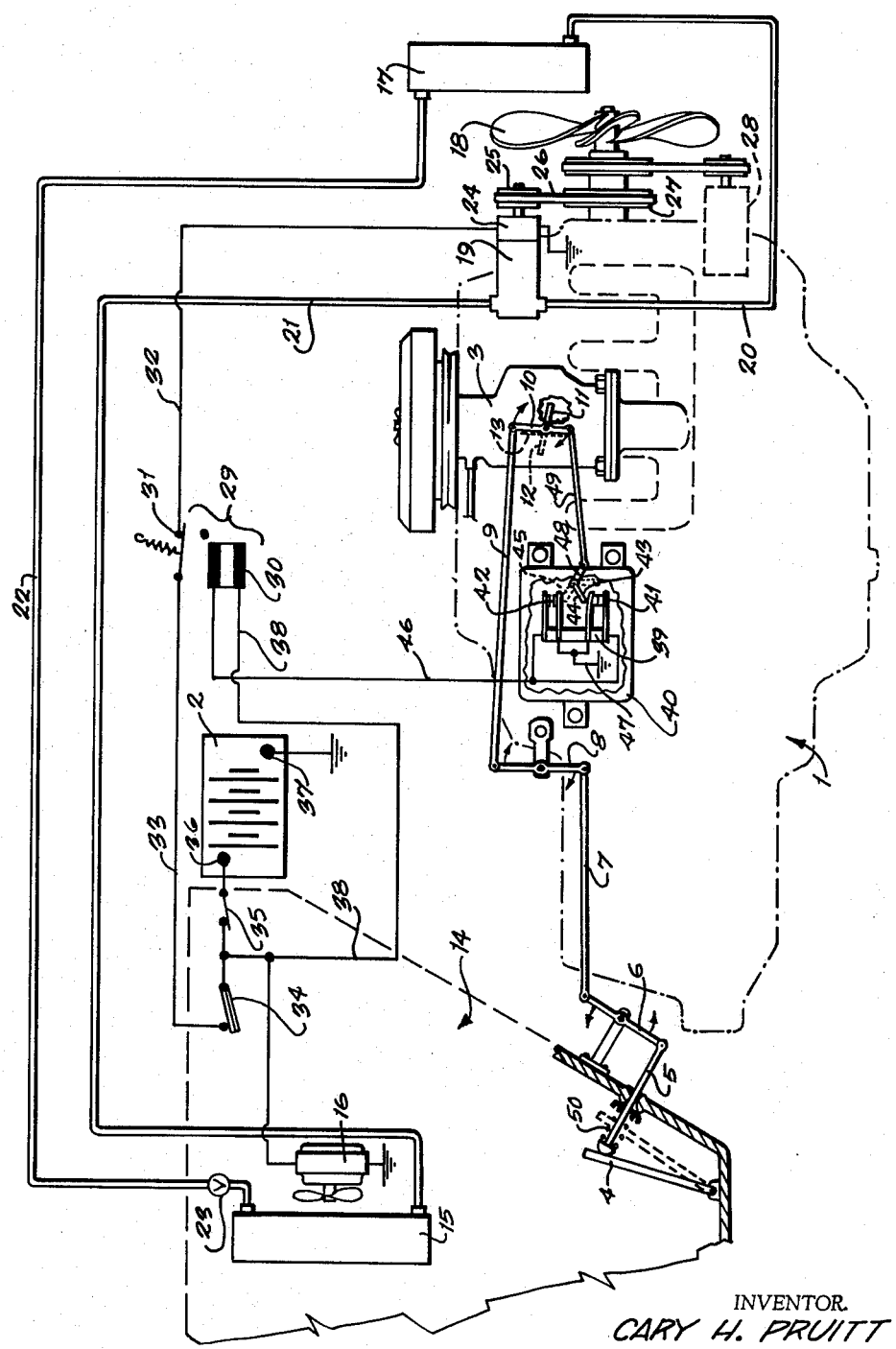

This invention relates to automobile engine driven refrigerating air conditioning apparatus, and more particularly to controls for minimizing the interference of the refrigerating apparatus with engine operation.

Automobile refrigeration air conditioning apparatus of the type having fluid compressors are commonly driven through a mechanical connection to the automobile engine. It has been recognized heretofore that it is often desirable to provide control devices for disconnecting or declutching the connection between the engine and compressor when maximum engine output is needed, for example, when passing traffic at high speed. It has been further recognized that an operating refrigeration compressor may add an excessive load to an idling automobile engine so as to cause the engine to idle roughly and, under certain conditions, to stall. In this latter respect, devices have been suggested for automatically increasing the idle speed or controlling the engine fuel metering to prevent rough idling when compressor operation is desired; however, such devices have been quite complex, expensive and difficult to install and keep in proper adjustment.

When automobile refrigeration air conditioning apparatus has been in operation for a short time, the heat load usually becomes sufficiently reduced in the passenger compartment so that it is possible to merely recirculate the air for a very few minutes without withdrawing additional heat and yet have the passengers remain comfortable.

The principal objects of the present invention are: to provide a control device for automotive refrigeration systems which automatically disengages the refrigeration compressor from the engine during engine idling conditions and when maximum engine power is called for; to provide such a device which is extremely simple and inexpensive in construction; to provide apparatus of this type which is easily mounted on new equipment or equipment already in service; to provide such apparatus which has very few moving parts and is easily maintained in proper adjustment; and to provide such apparatus which permits relatively low horsepower automotive engines to be effectively used for driving automotive air conditioning systems without elaborate and expensive control features.

Other objects and advantages of this invention will become apparent from the following description taken in connection with the accompanying drawing wherein are set forth by way of illustration and example certain embodiments of this invention.

The single figure is a schematic view of portions of an automobile with an air conditioning system associated therewith and embodying control apparatus of this invention.

Referring to the drawing in more detail:

The reference numeral 1 generally indicates an internal combustion engine having a battery 2 and a carburetor 3 controlled by selective movement of a gas pedal 4. The gas pedal 4, through suitable linkage rods 5 to 10 inclusive, rotates a throttle valve 11 located within the carburetor 3 between an engine idle position as indicated by the broken lines at 12 and an engine maximum power position as indicated by the broken lines at 13. A passenger compartment is schematically shown at 14.

Air conditioning apparatus on the automobile includes a refrigerant evaporator 15 located within or communicating with the passenger compartment 14 for cooling same. An air circulating fan 16 is positioned with respect to the evaporator 15 for forcing air therethrough in order to extract heat from the compartment 14 in a known manner. A refrigerant condenser 17 is preferably located in the engine compartment adjacent the radiator fan 18 for cooling compressed refrigerating fluid from a relatively high to a lower temperature. A refrigerant compressor 19 is also preferably located within the engine compartment and has suitable refrigerant lines 20 and 21 connecting same to the condenser 17 and evaporator 15. The condenser and evaporator are connected together with a suitable refrigerant line 22 having interposed therein an expansion or evaporation valve 23 for expanding the refrigerant within the evaporator 15.

An electrically-controlled clutch 24 of any well known type is interposed between and connects the compressor 19 with a pulley 25 which is, in turn, operatively connected by means of a belt 26 to a pulley 27 driven by the engine 1 along with the radiator fan 18 and a suitable electrical generator 28. An electrically-operated relay 29 has a coil 30 and a set of normally closed contacts 31. The clutch 24 is electrically connected by means of a conductor 32 through the contact set 31 to a conductor 33 which, in turn, connects through a thermostatic switch 34 contained within the passenger compartment 14 and a master air conditioning switch 35 to one side 36 of the battery 2. The other side 37 of the battery is connected through ground to the clutch 24 for completing the control circuit to the clutch. It is to be understood that when the contact set 31, thermostatic switch 34 and master switch 35 are closed, current is conducted through the clutch 24, producing a driving connection between the pulley 25 and compressor 19 whereby the operation of the engine 1 results in the driving of the compressor 19. When, however, one of the switches 34 or 35 or the contact set 31 are open, the compressor 19 becomes declutched and the pulley 25 becomes merely an idler.

The fan 16 is electrically connected between the thermostatic switch 34 and the master switch 35 for continuous operation while the switch 35 is closed, such operation being independent of the thermostatic switch 34 or the contact set 31. The coil 30 has one side thereof connected by means of a conductor 38 to one side 36 of the battery 2 through the master switch 35. A control in the form of a single pole double-throw limit switch 39 is preferably contained in a suitable protective box enclosure 40 mounted on the engine 1 adjacent the carburetor 3. The switch 39 comprises two spaced apart sets 41 and 42 of normally open contacts and a control arm 43 movable between two spaced apart opposite limit positions designated 44 and 45 for respectively closing the switch contact sets 41 and 42. The switch contact sets 41 and 42 are connected in parallel for independently making and interrupting electrical connection between a conductor 46 and ground at 47. The conductor 46 is connected to the other side of the coil 30 whereby an electrical circuit is completed through the coil 30 to the battery 2 upon the closing of either switch contact set 41 or 42. It is noted that neither set 41 nor 42 is closed when the control arm 43 is in an intermediate position between the limit positions 44 and 45.

Linkage rods 48 and 49 connect the control arm 43 to the throttle valve 11 through the linkage rod 10 for displacing the control arm 43 respectively to the opposite limit positions 44 and 45 when the throttle valve is moved respectively to said engine idle position 12 and maximum power position 13. Thus, the movement of the throttle valve 11 is synchronized with the movement of the control arm 43 to produce closure of the respective contact sets 41 and 42 when the throttle valve 11 is in either of its extreme positions but neither set 41 nor 42 is closed when the throttle valve is in any intermediate position.

The opening of the master switch 35 renders the entire refrigeration system inoperative. When inoperative, the system does not interfere with normal automobile operation since the pulley 25 merely idles, the coil 30 does not draw any current from the battery, the fan 16 is stationary, and only an insignificant additional frictional force is needed to depress the gas pedal 4 as a result of the linkage rods 48 and 49. When, however, air conditioning is desired, the master switch 35 is closed which causes operation of the fan 16 continuously. If the compartment 14 is uncomfortably warm, the thermostatic switch 34 automatically closes, completing a circuit from the battery to at least the relay contact set 31. Assuming the automobile is being driven under the usual conditions wherein the throttle valve 11 is neither closed to idle position nor open to maximum power position, the coil 30 is isolated from a completed circuit through ground to the battery 2 and the relay contact set 31 is thus closed causing the clutch 24 to be energized and connecting the pulley 25 to the compressor 19 for operating the refrigerating system to cool the compartment 14.

When the automobile is stopped, for example by a traffic light, pressure is taken from the gas pedal 4 which, through the reaction of a suitable compression spring 50 on the linkage rods 5 to 10 inclusive, causes the throttle valve 11 to move into idle position 12. This simultaneously causes the control arm 43 to close the contact set 41 completing the circuit through the relay coil 30 which opens the contact set 31, breaking the circuit to the clutch 24 and thereby declutching the compressor 19 for smooth idle operation. It is noted that if the driver expects to remain motionless for an extended period of time, the automobile may be shifted into neutral gear position and the gas pedal 4 slightly depressed which will result in the control arm 43 being raised to an intermediate position, breaking the circuit to the coil 30, and resulting in the closing of the contact set 31 and the driving of the compressor 19 for refrigerating the passenger compartment 14. This result also occurs when the automobile is normally driven and the refrigeration system continues to operate so long as the control arm 43 remains in an intermediate position and the thermostat switch 34 calls for refrigeration.

While driving, if the occasion arises when maximum power is needed, the gas pedal 4 is pressed to the limit of its displacement which causes the control arm 43 to close the contact set 42 also declutching the compressor 19 to permit maximum torque on the driving wheels of the automobile instead of dividing the engine output between the driving wheels and the compressor 19. When maximum power is no longer needed, this instinctively produces an easing off with respect to the gas pedal 4 which results in the compressor 19 again resuming a driving connection with the engine 1. Thus, a simple, inexpensive, easily adjustable, easily mountable control system is provided to obtain optimum performance from both the engine 1 and the refrigeration system.

Although one form of this invention has been illustrated and described, it is not to be limited to the specific form or arrangement of parts herein described and shown except insofar as such limitations are included in the claims.

What I claim and desire to secure by Letters Patent is:

1. A control for mounting on an automobile and the like having an internal combustion engine and a fuel metering device with an engine controlling movable throttle valve, said automobile having refrigeration apparatus including a refrigerant compressor, said control comprising: clutch means for operably connecting said compressor and said engine for selectively driving and declutching said compressor, and control means for operably associating with said throttle valve for moving therewith between an engine idle and engine operative position, said control means being operably associated with said clutch means and responsive to attaining said idle position for translating said clutch means into declutched condition, said control means being responsive to movement to an engine operative position for translating said clutch means into driving condition.

2. A control for mounting on an automobile and the like having an internal combustion engine and a fuel metering device with an engine controlling movable throttle, said automobile having refrigeration apparatus including a refrigerant compressor, said control comprising: clutch means for operably connecting said compressor and said engine for selectively driving and declutching said compressor, and control means for operably associating with said throttle for moving therewith between an engine idle and an engine maximum power position, said control means being operably associated with said clutch means and responsive to attaining said respective idle and maximum power positions for translating said clutch means into declutched condition, said control means being responsive to withdrawal from either of said idle and maximum power positions for translating said clutch means into driving condition.

3. A control for mounting on an automobile and the like having an internal combustion engine and a fuel metering device with an engine controlling movable throttle, said automobile having refrigeration apparatus including a refrigerant compressor, said control comprising: clutch means for operably connecting said compressor and said engine for selectively driving and declutching said compressor, and control means for operably associating with said throttle for moving therewith between an engine idle and an engine maximum power position, said control means being operably associated with said clutch means and responsive to attaining said respective idle and maximum power positions for translating said clutch means into declutched condition, said control means being responsive to withdrawal from either of said idle and maximum power positions for translating said clutch means into driving condition, said clutch means being of the electrically operated type and said control means including spaced apart sets of electrical contacts electrically related to said clutch means and each operable to translate said clutch means into declutched condition, said control means having a movable control arm adapted to operate said respective contact sets when said respective idle and maximum power positions are attained.

4. The apparatus control as set forth in claim 3 including electrically operated switch relay means electrically interposed between said contact sets and said clutch means.

5. In combination with an automobile having an internal combustion engine and a carburetor with an engine controlling movable throttle valve, said automobile having refrigeration apparatus for cooling the passenger compartment thereof including a refrigerant compressor, a refrigeration apparatus control comprising: clutch means operably connecting said compressor and said engine for selectively driving and declutching said compressor, and control means operably associated with said throttle valve for moving therewith between an engine idle and an engine maximum power position, said control means being operably associated with said clutch means and responsive to attaining said respective idle and maximum power positions for declutching said compressor, said control means being responsive to withdrawal from either of said idle and maximum power positions for actuating said clutch to drive said compressor.

6. In combination with an automobile having an internal combustion engine and a battery and a carburetor with an engine controlling movable throttle valve, said automobile having refrigeration apparatus including a refrigerant compressor: an electrically controllable clutch operably connecting said compressor and said engine for selectively driving and declutching said compressor, an electrically operated relay having a coil and a set of normally closed contacts, said clutch being electrically connected to said battery through said relay contact set for producing a driving connection between said engine and said compressor when said relay contact set is closed and declutching said compressor when said relay contact set is open, said coil having one side thereof connected to said battery, a single pole double-throw limit switch having two spaced apart sets of normally open contacts and a control arm movable between two spaced apart opposite limit positions for respectively closing said switch contact sets, said switch contact sets being electrically connected in parallel between the other side of said coil and said battery for completing an electrical circuit through said coil upon the closing of either switch contact set, and linkage arms connecting said control arms to said throttle valve for displacing said control arm respectively to said opposite limit positions when said throttle valve is moved to engine idle and engine maximum power positions, whereby said compressor is declutched when said engine is idling for smooth idle operation and said compressor is declutched when said engine is delivering maximum power for greater motive force.

References Cited by the Examiner

UNITED STATES PATENTS

| | | | |
|---|---|---|---|
| 2,746,261 | 5/56 | Gibson | 62—243 |
| 3,102,398 | 9/63 | Schjolin | 62—243 |
| 3,121,314 | 2/64 | Koyanagi | 62—243 |

WILLIAM J. WYE, *Primary Examiner.*